United States Patent [19]
Ljubman et al.

[11] Patent Number: 4,567,207
[45] Date of Patent: Jan. 28, 1986

[54] POLYMERIC MATERIAL ADAPTED FOR PHYSICO-CHEMICAL SEPARATION OF SUBSTANCES AND METHOD FOR PRODUCING SAME

[76] Inventors: Nazar Y. Ljubman, ulitsa Dzhandosova, 166, kv. 38; Gulsara K. Imangazieva, ulitsa Dzhandosova, 69, kv. 112; Lyalya T. Nugmanova, Mikroraion Sairan, 10, kv. 48; Alexandr I. Uskov, 2 Mikroraion, 45, kv. 36; Tokhtobubu C. Sydykova, Mikroraion "Orbita-4", 6, kv. 41; Zinaida I. Kim, ulitas Dzhandosova, 69, kv. 47, all of Alma-Ata, U.S.S.R.

[21] Appl. No.: 514,480

[22] Filed: Jul. 18, 1983

[51] Int. Cl.$^4$ ................................................. C08G 520
[52] U.S. Cl. ..................................... 521/35; 528/137; 528/254; 528/265; 528/266; 521/39
[58] Field of Search ................... 521/35, 39; 528/137, 528/265, 254, 266

[56] References Cited

U.S. PATENT DOCUMENTS 2,460,516  2/1949  Fuoces ................................. 528/137
2,809,178  10/1957  Turner et al. ........................ 528/137

FOREIGN PATENT DOCUMENTS 5023390  3/1975  Japan ..................................... 521/35

OTHER PUBLICATIONS

Chem. Abstracts, vol. 91, Entry 124326, Khose et al.
Chem. Abstracts, vol. 92, Entry 23252, Khose et al.
Chemical Abstracts, vol. 101, Entry 91975q.

*Primary Examiner*—Paul R. Michl
*Assistant Examiner*—Peter F. Kulkosky
*Attorney, Agent, or Firm*—Lilling & Greenspan

[57] ABSTRACT

A polymeric material comprising a solid dispersion of a porous three-dimensional polymer with a pore diameter of 0.002 to 10 $\mu$m and a permeability coefficient of from $2 \times 10^{-7}$ to $2 \times 10^{31}$ $^2$cm·sec$^{-1}$. This material is produced by reacting formaldehyde with at least one monomer capable of forming, with formaldehyde, a polymer of a three-dimensional structure. The reaction is carried out in the presence of a polymerization catalyst in an aqueous medium at a pH of from 0.1 to 4, while maintaining the polymer concentration within the range of from 20 to 65% by mass. Thereafter the solution with the polymer is maintained for a period sufficient to form a porous polymer in the form a solid dispersion.

22 Claims, No Drawings

POLYMERIC MATERIAL ADAPTED FOR PHYSICO-CHEMICAL SEPARATION OF SUBSTANCES AND METHOD FOR PRODUCING SAME

FIELD OF THE INVENTION

The present invention relates to high-molecular weight compounds and, more specifically, to a polymeric material adapted for a physico-chemical separation of substances.

The material according to the present invention can be used for separation of substances in various physico-chemical processes such as sorption, ion exchange, coalescence, back osmosis, hyperfiltration, ultrafiltration, microfiltration, purification of liquids and gases, dust-catching and purification of effluents, as well as in other processes necessitating recovery, separation or removal of substances.

BACKGROUND OF THE INVENTION

At the present time, numerous industries in carrying out basic manufacturing steps, must perform processes of separation and recovery of substances. With the progress of technology increasing importance is given to the quality of the material which is used as an aid in processes of separation and recovery. The separating material quality should meet the requirements implicated in the solution of the following problems: (1) recovery of valuable substances; (2) regeneration of process water; (3) conditioning of process solutions and gases; (4) purification of effluents which is of prime importance for the environment protection.

It is known in the art to use naturally-occurring polymers as separation materials in the form of cotton and wool fabrics. At the present time there is a universal tendency to change cotton and wool filtering fabrics with filtration materials from synthetic polymeric fibres such as polypropylene, polytetrafluoroethylene and polyamide fibres.

The materials ensure only a mechanical separation of substances in accordance with the screening effect which does not enable differentiation of substances according to their type and properties.

The depth and selectivity of separation are substantially increased in the case where the filtration process is combined with back osmosis or ultrafiltration. Special membrane partitions are intentionally made for this purpose. The most extensively used are acetylcellulose membranes which are prepared by wet coagulation of a solution of acetylcellulose in formamide (cf. U.S. Pat. No. 3,666,508 Cl. 106-183).

A disadvantage of acetylcellulose filtering aids is their chemical instability; they feature low performance properties, limited service life and low resistance in acidic media.

To overcome the above-mentioned disadvantages and increase resistance to aggressive media, the company "Millipore Inc." his suggested production of membrane filters based on polytetrafluoroethylene or polyvinylchloride. However, these filtering materials at a high chemical resistance have hydrophobic characteristics. Therefore, they cannot be employed in processes of filtration of aqueous solutions.

The company "Akzona Inc." has developed a novel method for the preparation of microporous polymers based on polyolefins (cf. U.S. Pat. No. 4,247,498 Cl. 264-41). This method comprises dissolution of polyolefins at an elevated temperature in aromatic hydrocarbons, amines, alcohols or ketones, followed by cooling the heated solutions. The thus-prepared materials comprise, according to the company's contention, a new generation of porous materials with the brand name "Accurel" and a controlled pore diameter of 0.2 to 0.4 $\mu$m.

At the present time the state of the art lacks a polymeric filtering material possessing required properties to satisfy modern requirements of substance purification, such as separation, recovery, removal, versatility in this particular area of application, and be simultaneously selective and efficient.

It is an object of the present invention to provide such a polymeric filtering material having a broad range of its filtering capacity, and which would be suitable for various processes of physico-chemical separation of substances and possess a high separation efficiency, stability in operation and simplicity in manufacture.

SUMMARY OF THE INVENTION

This object is accomplished by the provision of a polymeric material adapted for physico-chemical separation of substances which, according to the present invention, comprises a porous polymer with a three-dimensional structure having a pore diameter of 0.002 to 10 $\mu$m and permeability coefficient from $2\times10^{-7}$ to $2\times10^{-2}$ cm·sec$^{-1}$.

This method for preparing this polymeric material, according to the present invention, comprises reacting formaldehyde with at least one monomer capable of forming, with formaldehyde, a polymer of a three-dimensional structure in the presence of a polymerization catalyst in an aqueous medium with its pH maintained within the range of from 0.1 to 4. The resulting polymer concentration is maintained within the range of from 20 to 65% by mass, followed by residence for a period sufficient to form a solid dispersion with a pore diameter of 0.002 to 10 $\mu$m and a permeability coefficient of from $2\times10^{-7}$ to $2\times10^{-2}$ cm·sec$^{-1}$.

The polymeric filtering material according to the present invention has high separating power in various physico-chemical processes such as sorption, ion-exchange, coalescence, reverse osmosis, hyperfiltration and the like. This material also has high mechanical strength and osmotic stability. Being a solid body, it can be easily subjected to any kind of machining. From the material according to the present invention articles of substantially any shape can be produced.

The polymeric material according to the present invention comprises a polymer with the elementary unit of the formula:

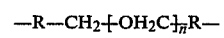

wherein

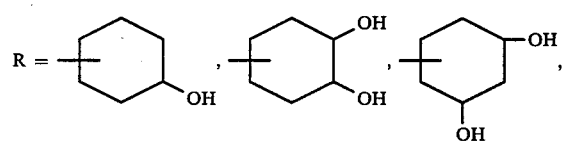

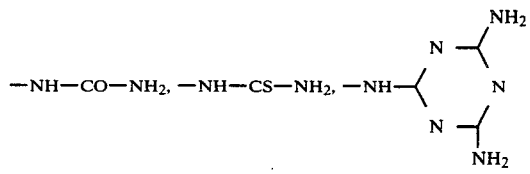

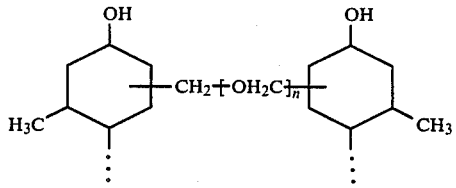

wherein n=0-2.

Depending on the structure of the elementary unit of the polymer, as well its permeability and pore size, there are possible various embodiments of the material according to the present invention. A polymeric material wherein the elementary unit has the formula:

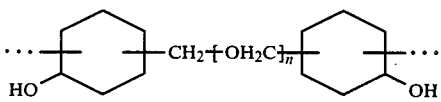

wherein n=0-2, is useful for coalescent separation of emulsions.

A polymeric material wherein the elementary unit has the formula:

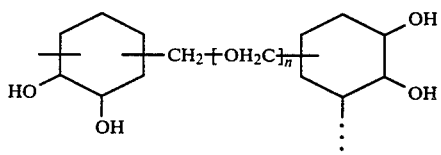

wherein n=0-2, is useful mainly for recovery of arsenic.

A polymeric material wherein the elementary unit has the formula:

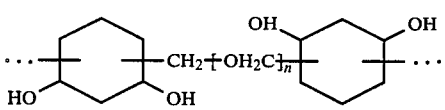

wherein n=0-2, is useful for recovery of thallium.

A polymeric material wherein the elementary unit has the formula:

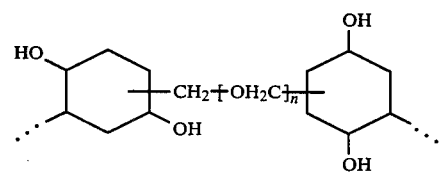

wherein n=0-2, is useful for transfer of electrons and primarily for the removal of oxygen.

A polymeric material wherein the elementary unit has the formula:

$$\text{structure with two cyclohexane rings, OH groups and SO}_3\text{H groups, connected by }-CH_2(OH_2C)_n-$$

wherein n=0-2, is useful for cation exchange and primarily for water softening.

A polymeric material, wherein the elementary unit has the formula:

$$\text{structure with two cyclohexane rings, OH and CH}_3\text{ groups, connected by }-CH_2(OH_2C)_n-$$

wherein n=0-2, is useful for sorption of dissolved organic components.

A polymeric material wherein the elementary unit has the formula:

—NH—CS—N—CH₂(OH₂C)ₙNH—CS—N— wherein n=0-2, is useful for an ion-exchange separation and primarily for recovery of heavy metal ions.

A polymeric material wherein the elementary unit has the formula:

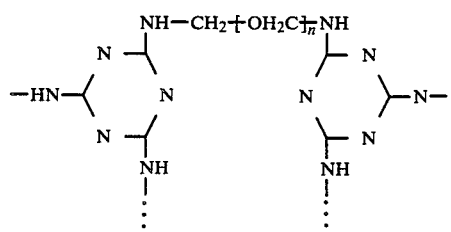

wherein n=0-2, is useful for an anion-exchange separation of oxygen anions and for separation of molybdenum from rhenium.

A polymeric material wherein the elementary unit has the formula:

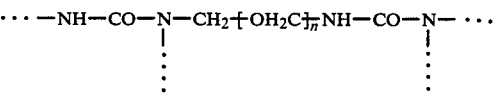

wherein n=0-2 is useful for filtration in strong-alkali media.

An advantage of the material of the present invention is its effective filtering capacity in separation processes: sorption, ion exchange, coalescence, microfiltration, ultrafiltration, reverse osmosis and the like. It provides for quantitative recovery of dissolved components such as arsenic, antimony, molybdenum, thallium and the like. This material can be efficiently employed for carrying out filtration of liquids, purification of gases and dust catching.

DETAILED DESCRIPTION OF THE INVENTION

As already mentioned hereinbefore, the polymeric material adapted for physico-chemical separation of substances according to the present invention comprises a solid dispersion of a porous polymer having a three-dimensional structure with a pore diameter of from 0.002 to 10 μm and a coefficient of permeability ranging from $2\times10^{-7}$ to $2\times10^{-2}$ cm·sec$^{-1}$.

One of the features characterizing the polymeric filtering material according to the present invention is the solid dispersion state of the polymer. By the term "solid dispersion" is meant the state of a polymer, wherein properties of a suspension and those of a solid body are combined for the case where water is dispersed in the polymer.

Another feature characterizing the polymeric filtering material according to the present invention is its three-dimensional structure. A further feature of the material according to the invention is its porosity and permeability. The pore diameter is within the range of from 0.002 to 10 μm and the permeability coefficient ranges from $2\times10^{-7}$ to $2\times10^{-2}$ cm·sec$^{-1}$.

This polymeric material is prepared by the method which, according to the present invention, comprises reacting formaldehyde with at least one monomer capable of forming, with formaldehyde, a polymer having a three-dimensional structure. The reaction is carried out in the presence of a polymerization catalyst in an aqueous medium. During the reaction, the pH of the medium is maintained within the range of from 0.1 to 4 and the resulting polymer concentration is controlled within the limits of from 20 to 65% by mass. When the polymer concentration within this range is achieved, the solution with the polymer is kept for a period sufficient to form a solid dispersion of the polymer.

As the starting monomer suitable for the reaction with formaldehyde use can be made of any monomer capable of forming, with formaldehyde, a three-dimensional structure. Such monomers can be exemplified by phenol, polyhydric phenols, cresols, sulphophenolic compounds, carbamide compounds and the like. The polymerization catalyst can such compounds as alkalis and acids.

The reaction is carried out at a temperature within the range of from 20° to 90° C. depending on the starting monomer and the type polymerization catalyst.

The molar ratio of formaldehyde to the monomer is varied within the range of from 1.3:1 to 8.0:1 respectively.

As mentioned hereinabove, during the reaction the concentration of the resulting polymer is maintained within the range of from 20 to 65% by mass. The lower limit is determined from the fact that at a concentration of the polymer in the solution below 20% the material has no solid dispersion condition. Thus, the polymer becomes dispersed and loses the above-specified properties. The upper limit of the polymer concentration is defined by the fact that at a concentration of the polymer above 65% its porosity is decreased and, consequently, its permeability is reduced. Therefore, violation of the above-specified concentration range will result in failure to obtain a material with the desired properties. During the reaction the pH of the reaction mass is maintained within the range of from 0.1 to 4. At a pH below 0.1 the porosity is reduced and, consequently, permeability of the material is lowered. At a pH of above 4 the degree of adherence between particles is lowered and the material cannot be obtained in the state of a solid dispersion. If the polymerization reaction is carried out in special molds, it is possible to simultaneously obtain the material and an article therefrom. Articles may have different shape depending on their end use such as tubes, sheets, membranes, fibers, capillaries and the like.

The method according to the present invention is performed in the following manner. The abovementioned starting components—formaldehyde and monomer in a molar ratio of 1.3–8.0:1—are mixed in an aqueous medium and maintained until the formation of a product in the form of a solid dispersion, while maintaining the polymer concentration within the range of from 20 to 65% and the pH at a value of from 0.1 to 4. The resulting product is porous, permeable and three-dimensional. This product is commercial and ready for use. As it is seen from the description, the method is simple to perform and can be readily implemented on a commercial scale, since it necessitates no special equipment and expensive hardly-available components. Another advantage of the present invention resides in the possibility of simultaneous production of the material and an article therefrom.

For a better understanding of the present invention, some specific examples are given hereinbelow which illustrate the polymeric filtering material and the process for producing same according to the present invention. Unless otherwise specified, in all of the examples the concentration of substances is expressed in percent by mass.

EXAMPLE 1

Into a reaction vessel there are charged 670 g of phenol, 187 ml of a 35% aqueous solution of formaldehyde, 190 g of paraform and 26 g of sodium hydroxide. The reaction mixture is maintained at a temperature of 60° C. for 90 minutes, whereafter there are added 996 ml of a 98% acetic acid and hydrochloric acid to a pH=3.

The resulting solution with a concentration of the formed polymer of 43% is maintained at a temperature of 70° C. for 25 hours. On expiration of this period the polymer is withdrawn from the reaction vessel. This polymer has a three-dimensional structure and comprises a solid dispersion with a pore diameter of 20 to 40 Å and a permeability coefficient of $2.2\times10^{-7}$ cm·sec$^{-1}$. This material is used in reverse osmosis processes as a separating membrane.

EXAMPLE 2

Into a three-necked reactor provided with a stirrer, reflux condenser and a thermometer three are charged 323 g of phenol, 370 ml of a 35% aqueous solution of formaldehyde and 13 g of sodium hydroxide. The mixture is stirred and maintained for 90 minutes at a temperature of 60° C., whereafter there are added 1,376 ml of 98% acetic acid and hydrochloric acid to a pH=3. The resulting solution having a concentration of the formed polymer of 21% is poured into the intertubular space of a stainless steel mold comprising a sleeve with a height of 280 mm and inside diameter of 120 mm, whereinto a rod with an outside diameter of 70 mm is coaxially inserted. The filled mold is sealed and placed into a thermal cabinet with a temperature of 80° C. After 25 hours of residence therein the mold is cooled and a yellow article with a height of 270 mm and thickness of filtering walls of 25 mm is withdrawn therefrom.

The resulting article has the following properties: pore diameter 8–10 μm, permeability coefficient $5.7 \times 10^{-3}$ cm·sec$^{-1}$. This article is tested in a process of coalescent separation of an emulsion. An aqueous emulsion containing 66 mg/l of kerosene is passed through the polymeric article at the rate of 590 l/hr. At the outlet from the article there is produced a readily and rapidly separable system consisting of two phases: an aqueous phase containing 0.7 mg/l of kerosene and an organic phase containing 0.18 g/l of water.

EXAMPLE 3

Into a reaction vessel there are charged 454 ml of a 30.6% aqueous solution of pyrocatechol, 144 ml of a 37% aqueous solution of formaldehyde and hydrochloric acid to a pH=2. The solution is stirred at a temperature of 60° C. for 1 hour and 40 minutes. Then it is cooled to a temperature of 30.7° C. The resulting solution with the concentration of the polymer of 32% is kept at a temperature of 30.7° C. for 46 hours and at a temperature of 82° C. for 30 hours. Thereafter, a three-dimensional polymer is withdrawn from the vessel. The product comprises a solid dispersion with a pore diameter of 4–7 μm and a coefficient of permeability of $8.6 \times 10^{-4}$ cm·sec$^{-7}$.

The thus-produced material is tested in a process of purification of solutions from electrolytic copper production. The starting solution having the following composition (g/l): copper—47.0, arsenic—11.8, nickel—18.7, antimony—0.8, slime—0.1, sulphuric acid—160, is passed through the material for one hour to give 24 liters of a filtrate having the following composition (g/l): copper—47.0, arsenic—10.9, nickel—18.7, antimony—0.1, slime—0.018, sulphuric acid—160. The filtering capacity is regenerated by purging with compressed air and elution of antimony is effected by treatment with 7N hydrochloric acid. During the elution there is obtained 1.0 liters of an eluate containing 16.3 g/l of antimony.

EXAMPLE 4

Into a reaction vessel there are charged 454 ml of a 30.6% aqueous solution of pyrocatechol, 144 ml of a 37% aqueous solution of formaldehyde and hydrochloric acid to a pH=2. The solution is stirred at a temperature of 55° C. for 1 hour 50 minutes, and cooled to a temperature of 32.6° C. The resulting solution with the formed polymer concentration of 32% is kept at a temperature of 32.6° C. for 46 hours and at a temperature of 82° C. for 30 hours. Thereafter, a polymer is withdrawn from the vessel. The polymer has a three-dimensional structure and comprises a solid dispersion with a pore diameter of 3–5 μm and permeability coefficient of $1.2 \times 10^{-4}$ cm·sec$^{-1}$.

The thus-produced material is tested in the process of decontamination of sulphuric acid from arsenic. The starting solution having the following composition (g/l): arsenic—3.5, iron—0.98, sulphuric acid—380 is passed through the material at the volume rate of 200 unit volumes/hr. In doing so, a filtrate is obtained which has the following composition (g/l): arsenic—0.007, iron—0.83, sulphuric acid—366. The material is regenerated by treating it with water at a temperature of 70° C.

EXAMPLE 5

A reaction mixture is prepared by intermixing 1.15 liters of a 44.0% aqueous solution of resorcinol, 498 ml of a 35% aqueous solution of formaldehyde and hydrochloric acid to a pH=4 and stirring is continued for an additional 3 hours. The resulting solution with the polymer concentration of 40% is cast into 14 moulds made from polyethylene. The mold comprises two coaxially positioned tubes and the intertubular space is filled with a solution of the polymer obtained as above. The charged molds are placed into a water thermostat at a temperature of 20° C. After 24 hours the molds are transferred into a thermal cabinet at a temperature of 80° and kept therein for 48 hours. Afterwards, tubular articles having good mechanical strength are extracted from the molds. The articles have a length of 341 mm, filtering wall thickness of 4 mm, pore diameter of 0.03–0.06 μm and permeability coefficient of $8.6 \times 10^{-6}$ cm·sec$^{-1}$. The ultimate compression strength of the article is 250 kg/cm$^2$.

The thus-produced polymeric tubular articles are tested in the process of ultrafiltration. Subjected to the ultrafiltrational purification is a copper electrolyte having the following composition (g/l): sulphuric acid—153, copper—45, nickel—12, arsenic—8, antimony—0.8, dispersed slime inclusions—0.048 (particle size of 0.04–0.1 μm), emulsifield organic substances—0.18.

The resulting filtrate contains (g/l): sulphuric acid—153, copper—45, nickel—12, arsenic—8, antimony—0.8, dispersed slime inclusions—none, emulsified organic substances—0.001. The yield of the filtrate is 98%, the concentrate contains about 2.3 g/l of slime inclusions and 9 g/l of emulsified organic substances.

Operation of the ultrafiltration unit for 150 hours revealed no noticeable change of filtering properties of the tubular polymeric articles.

EXAMPLE 6

Into a reaction vessel there are charged 452 ml of a 30% aqueous solution of resorcinol, 138 ml of a 37% aqueous solution of formaldehyde and hydrochloric acid to a pH=4 and the reaction mass is stirred for 2 to 6 hours. The resulting solution having a concentration of the formed polymer of 38% is maintained at the temperature of 20° C. for 46 hours and then at the temperature of 82° C. for 24 hours. On expiration of this period a polymer is withdrawn from the reaction vessel. The product has a three-dimensional structure and comprises a solid dispersion with a pore diameter of 6–9 μm and permeability coefficient of $6.6 \times 10^{-3}$ cm·sec$^{-1}$.

This polymer is tested in the process of decontamination of waste liquiors, resulting from the production of lead and zinc, from thallium. The starting solution (pH=9) having the following composition (g/l): zinc—1.5, cadmium—0.2, thallium—0.02 is passed through the polymer at a rate of 400 unit volumes per hour. The filtrate contains (g/l): zinc—1.5, cadmium—0.2, thallium—traces. The polymer regeneration is effected by treatment with a 15% sulphuric acid to give an eluate containing 11.8 g/l of thallium.

EXAMPLE 7

Into a reaction vessel there are charged 200 ml of a 55% aqueous solution of hydroquinone, 226 ml of a 37% aqueous solution of formaldehyde and hydrochloric acid to a pH of 0.1 and stirring is effected for 90 minutes. The resulting solution with the formed polymer concentration of 45% is maintained at a temperature of 50° C. for 24 hours and at the temperature of 83° C. for 48 hours. On expiration of this period a polymer product is withdrawn from the reaction vessel. The product has a three-dimensional structure and comprises a solid dispersion with a pore diameter of 5–7 μm and permeability coefficient of $1.9 \times 10^{-3}$ cm·sec$^{-1}$.

This material is tested in the process of oxygen removal from water.

EXAMPLE 8

Into a three-necked reactor provided with a stirrer, reflux condenser and thermometer there are charged 324 g of m-cresol, 226 ml of a 37% aqueous solution of formaldehyde, 98 g of paraform and 17 g of sodium hydroxide. The mixture is stirred and maintained at a temperature of 60° C. for 90 minutes, whereafter it is charged with 892 ml of a 98% acetic acid and hydrochloric acid to a pH=1. The resulting solution with the formed polymer concentration of 31% is kept at the temperature of 80° C. After 25 hours a three-dimensional polymer is discharged from the vessel. The product comprises a solid dispersion with a pore diameter of 3–5 μm and permeability coefficient of $1.1 \times 10^{-4}$ cm·sec$^{-1}$.

The thus-produced material is tested in the process of removal of dissolved organic components. The starting solution containing 5 mg/l of kerosene is passed through the material at a rate of 200 unit volumes per hour. In the effluent filtrate, kerosene is not detected by chromatography. The material is regenerated by treating with live steam.

EXAMPLE 9

A reaction mixture is prepared by dissolving 160 g of urea in 220 ml of a 35% aqueous solution of formaldehyde, followed by the addition of 10g of resorcinol. The mixture is stirred for 15 minutes at a pH=4. The resulting solution with the concentration of the formed polymer of 59% is cast into molds. The molds are made of coaxially positioned polyethylene tubes and the solution is poured into the intertubular space. The filled moulds are kept at room temperature. After 24 hours they are placed into a thermal cabinet at a temperature of 80° C. and kept therein for 48 hours. Thereafter articles are extracted from the molds. The articles have a tubular shape with a high mechanical strength and a length of 170 mm, filtering wall thickness of 4 mm, pore diameter of 0.003–0.008 μm and permeability coefficient of $3.6 \times 10^{-7}$ cm·sec$^{-1}$.

The thus-produced polymeric tubular articles are used in the process of reverse osmosis.

EXAMPLE 10

A reaction mixture is produced by combining 1.3 liters of a 37% aqueous solution of urea, 72 ml of a 17% phosphoric acid and 811 ml of a 35% aqueous solution of formaldehyde. The mixture is stirred for 2 minutes at a pH=3.5. The resulting solution with the concentration of the formed polymer of 34% is poured into the intertubular space of a mold made of stainless steel and comprising a sleeve with a height of 280 mm and inside diameter of 120 mm, whereinto a rod with an outside diameter of 70 mm is inserted. The filled mold is kept at room temperature for 2 hours and at a temperature of 80° C. for 24 hours. After cooling the article is withdrawn in the form of a matted white thick-walled tube.

The thus-produced article comprises a polymer in a solid dispersion state with a pore diameter of 0.7–0.9 μm, permeability coefficient of $7.3 \times 10^{-5}$ cm·sec$^{-1}$, and breaking compression strength of 0.74 kgf/cm$^2$. It is chemically resistant in strong-alkali media.

The article is used as a filtering cartridge. Its catching power relative to the solid phase of an argillaceous suspension with a particle size of 1 μm is substantially equal to 100% at a complete regenerability by back purging with compressed air.

EXAMPLE 11

A reaction mixture is prepared by combining 1.0 liter of a 43% aqueous solution of urea, 232 ml of a 19% aqueous solution of resorcinol, 55 ml of 15% phosphoric acid and 875 ml of a 35% aqueous solution of formaldehyde. The mixture is stirred for 2 minutes at a pH=4.0. The resulting solution with a concentration of the formed polymer of 34% is poured into the intertubular space of a stainless steel mold comprising a sleeve with a height of 280 mm and an inside diameter of 120 mm, whereinto a rod is inserted with an outside diameter of 70 mm. The filled mold is kept at room temperature for 2 hours and at a temperature of 80° C. for 24 hours. After cooling the article is removed. Its material has a three-dimensional structure and comprises a solid dispersion with a pore diameter of 0.9–1.8 μm, permeability coefficient of $1.2 \times 10^{-4}$ cm·sec$^{-1}$ and breaking compression strength of 8.7 kgf/cm$^2$.

The article is used as a filtering cartridge.

EXAMPLE 12

Into a three-necked reactor provided with a stirrer, reflux condenser and thermometer there are charged 396 g of melamine, 739 ml of a 35% aqueous solution of formaldehyde and 53 ml of a 26% aqueous solution of ammonia. The mixture is stirred at a temperature of 60° C. for 120 minutes, then charged with 351 ml of water along with 351 ml of a 98% acetic acid. The resulting solution with a pH=4 and concentration of the formed polymer of 33% is poured into the intertubular space of a mold made from two coaxially positioned stainless-steel tubes. The filled mould is placed into a heating cabinet at a temperature of 70° C. After residence for 25 hours the article is withdrawn. It has a white color, height of 275 mm and filtering wall thickness of 25 mm. The material of the article has a three-dimensional structure and comprises a solid dispersion with a pore diameter of 0.4–0.6 μm and permeability coefficient of $3.6 \times 10^{-5}$ cm·sec$^{-1}$.

The thus-produced article is tested in a process of separation of molybdenum and rhenium. The starting solution with a pH=1 and having the following composition (g/l): rhenium—0.18, molybdenum—0.42 is filtered through the article at the rate of 200 unit volumes per hour. The solution effluent from the article does not substantially contain molybdenum, while the concentration of rhenium remains substantially unchanged, i.e. in this manner an absolute separation of molybdenum from rhenium is achieved. The filtering element is regenerated by way of treatment with a 10% solution of ammonia to give an eluate containing 8.8 g/l of molybdenum.

EXAMPLE 13

Into a three-necked reactor provided with a stirrer, reflux condenser and thermometer there are charged 500 g of melamine, 945 ml of a 35% aqueous solution of formaldehyde and 61 ml of a 26% aqueous solution of ammonia. The mixture is stirred at a temperature of 60° C. for 120 minutes, followed by the addition of 430 ml of a solution having the following composition (g/l): hydrochloric acid—37, resorcinol—117. The resulting solution with a pH=4 and the concentration of the formed polymer of 52% is cast into the intertubular space of a mold comprising two coaxially positioned stainless-steel tubes. The filled mold is placed into a heating cabinet at a temperature of 70° C. After 25 hours a white article is withdrawn which has a height of 275 mm and a filtering wall thickness of 25 mm. The material of the article is of a three-dimensional structure and comprises a solid dispension with a pore diameter of 0.8–2.2 $\mu$m and permeability coefficient of $3.7 \times 10^{-4}$ cm·sec$^{-1}$.

The thus-produced article is tested in the process of removing acids from aqueous media. The starting solution containing 100 mg/l of hydrochloric acid is passed through the article at a rate of 200 unit volumes per hour. The concentration of hydrochloric acid in 200 liters of the filtrate is reduced down to 0.3 mg/l. The filtering member is regenerated by way of treatment with a 10% aqueous solution of ammonia.

EXAMPLE 14

Into a three-necked reactor provided with a stirrer, reflux condenser and thermometer there are charged 456 g of thiourea, 140 g of resorcinol and 1.1 liter of a 30% aqueous solution of formaldehyde. The mixture is stirred at a temperature of 60° C. for 120 minutes, whereafter there are added 540 ml of a solution having the following composition (g/l): sulphuric acid 28, urea 170. The resulting solution has a pH=0.1 and the concentration of the formed polymer of 20% is poured into the intertubular space of a mold made of coaxially positioned polyethylene tubes. The filled mold is placed into a heating cabinet at a temperature of 70° C. and kept therein for 25 hours. The resulting article has an orange color, height of 275 mm and filtering wall thickness of 25 mm. The material of the article has a three-dimensional structure and comprises a solid dispersion with a pore diameter of 5–10 $\mu$m and permeability coefficient of $1.8 \times 10^{-2}$ cm·sec$^{-1}$.

The thus-produced article is tested in recovering heavy metals from process solutions. The starting solution containing 80 g/l of bismuth is passed through the article at a rate of 200 unit volumes per hour. The concentration of bismuth in 420 liters of the filtrate is lowered to 0.08 mg/l. The filtering element is regenerated by way of its treatment with a solution of the following composition (g/l): thiourea—100, sulphuric acid—56 to give an eluate containing 3.6 g/l bismuth.

EXAMPLE 15

Into a three-necked reactor provided with a stirrer, dropping funnel and cooler there are placed 611 g of phenol. The reactor is heated to a temperature of 90° C. on a water bath under stirring and charged, from the dropping funnel, with 340 ml of a 86% sulphuric acid for 1 hour. The mixture is stirred for 1 hour at 90° C., then charged with 1.2 liters of a 35% aqueous solution of formaldehyde, 450 ml of 98% acetic acid and 520 g of paraform. The resulting solution has a pH=0.1 and the concentration of the formed polymer of 31% is poured into the intertubular space of a mold comprising coaxially mounted stainless-steel tubes. The filled mould is placed into a boiling water bath. After 25 hours of residence a dark-cherry article is withdrawn. The material in the article has a three-dimensional structure and comprises a solid dispersion with a pore diameter of 0.3–0.5 $\mu$m and permeability coefficient of $2.2 \times 10^{-5}$ cm·sec$^{-1}$.

The thus-produced article is tested in the process of water softening. The starting solution containing 100 mg/l of calcium is passed through the article at the rate of 200 unit volumes per hour. The concentration of calcium in 500 liters of the filtrate is reduced to 1.2 mg/l. The filtering material is regenerated by treatment with a 5% solution of NaCl and can then be used again.

What is claimed is:

1. A polymeric material adapted for physico-chemical separation of substances comprising a porous material of a three-dimensional structure in the state of a solid dispersion with a pore diameter of from 0.0025 to 10 $\mu$m and a permeability coefficient of from $2 \times 10^{-7}$ to $2 \times 10^{-2}$ cm·sec$^{-1}$, and containing a polymer with an elementary unit of the formula:

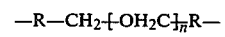

wherein

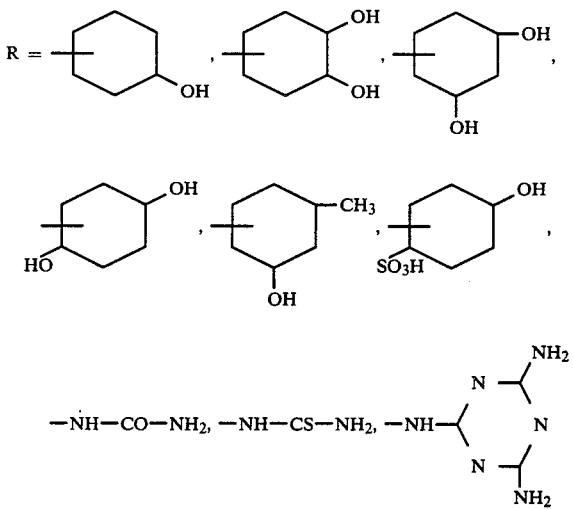

wherein n=0.2.

2. A polymeric material adapted for an ion-exchange separation and mainly for recovery of heavy metal ions according to claim 1, wherein the elementary unit of the polymer has the formula:

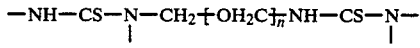

wherein n=0-2.

3. A polymeric material adapted for an anion-exchange separation of oxygen anions and for separation of molybdenum from thenium according to claim 1, wherein the elementary unit of the polymer has the formula:

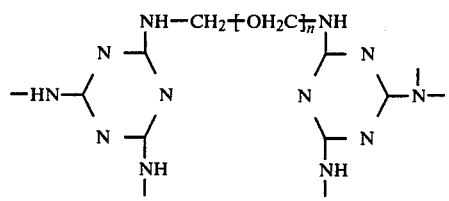

wherein n=0-2.

4. A polymeric material intended for filtration in strong-alkali media according to claim 1, wherein the elementary unit of the polymer has the formula:

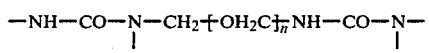

wherein n=0-2.

5. A method for producing a polymeric material adapted for physico-chemical separation of substances, comprising:
reacting formaldehyde with at least one monomer capable of forming, with formaldehyde, a three-dimensional polymer, in the presence of a polymerization catalyst in aqueous media at a pH of from 0.1 to 4, while maintaining the polymer concentration at 20 to 65% by mass, for a time sufficient to form a solid dispersion at a porous three-dimensional polymer with a pore diameter of from 0.0025 to 10 μm and a permeability coefficient of from $2 \times 10^{-7}$ to $2 \times 10^{-2}$ cm·sec$^{-1}$;
wherein said monomer is selected from the group consisting of phenol, polyhydric phenols, cresols, sulphophenolic compounds, and carbamide compounds;
and wherein said carbamide compounds are selected from the group consisting of urea, thiourea, and melamine.

6. A method according to claim 5, wherein the temperature varies from within the range of from 20° to 90° C.

7. A method according to claim 5, wherein the molar ratio between formaldehyde and the monomer is 1.3–8.0:1.

8. A method according to claim 5, wherein as the monomer capable of forming a three-dimensional polymer use is made of a monomer of the formula:

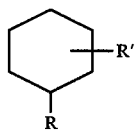

wherein R and R' are the same or different radicals selected from the group consisting of —OH, —CH₃, —SO₃H.

9. A polymeric composition comprising a solid dispersion of a porous three-dimensional structure having an elementary unit of the formula:

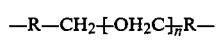

wherein R is selected from the group consisting of:

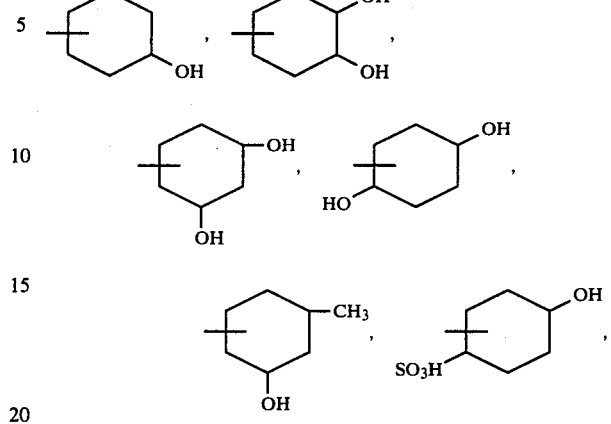

and n=0-2; said polymeric composition having a pore diameter of 0.002 to 10 m and a permeability coefficient of $2 \times 10^{-2}$ cm·sec$^{-1}$ formed by a method comprising: reacting formaldehyde with at least one monomer capable of forming, with formaldehyde, a three-dimensional polymer in the presence of a polymerization catalyst in an aqueous medium maintained at a pH of from about 0.1 to 4 to form a resulting polymer whose concentration is maintained at 20 to 65% by mass, residing for a period sufficient to form said solid dispersion.

10. The polymeric composition of claim 9, wherein the molar ratio between formaldehyde and said monomer is about 1.3–8.0:1.

11. The polymeric composition of claim 9, wherein said monomer has the formula:

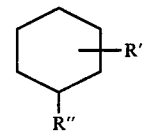

wherein R' and R" are the same or different radicals selected from the group consisting of —OH, —CH₃, —SO₃H.

12. The polymeric composition of claim 9, wherein said monomer is a carbamide.

13. The polymeric composition of claim 12, wherein said carbamide is selected from the group consisting of urea, thiourea, and melamine.

14. The polymeric composition of claim 9, wherein said reaction is carried out at a temperature of about 20°–90° C.

15. The polymeric composition of claim 9, wherein the polymer elementary unit has the formula:

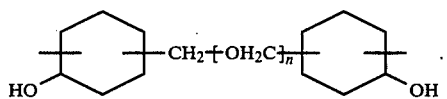

16. The polymeric composition of claim 9, wherein the elementary unit of the polymer has the formula:

17. The polymeric composition of claim 9, wherein the elementary unit of the polymer has the formula:

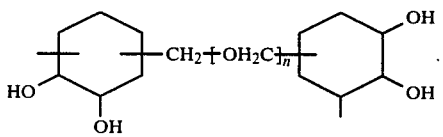

18. The polymeric composition of claim 9, wherein the elementary unit of the polymer has the formula:

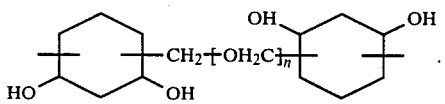

19. The polymeric composition of claim 9, wherein the elementary unit of the polymer has the formula:

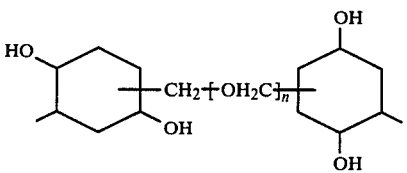

20. The polymeric composition of claim 9, wherein the elementary unit of the polymer has the formula:

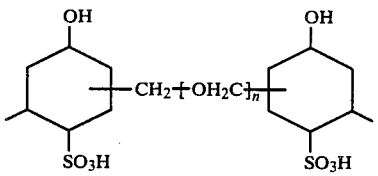

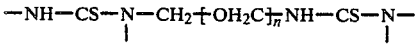

wherein n=0–2.

21. The composition of claim 9, wherein the pore diameter varies from about 0.002 to 10 microns.

22. The composition of claim 9, wherein the permeability coefficient varies from about $2 \times 10^{-7}$ to $2 \times 10^{-2}$ cm·sec$^{-1}$.

* * * * *